FAULT DETECTING DEVICES FOR CHARACTER RECOGNITION

Filed April 23, 1964 6 Sheets-Sheet 1

Inventor:
Marc Charles Joseph Lesueur
BY Baldwin & Wight
Attorneys

Nov. 15, 1966 M. C. J. LESUEUR 3,286,233

FAULT DETECTING DEVICES FOR CHARACTER RECOGNITION

Filed April 23, 1964 6 Sheets-Sheet 2

Inventor:
Marc Charles Joseph Lesueur
BY Baldwin & Wight
Attorneys

FAULT DETECTING DEVICES FOR CHARACTER RECOGNITION

Filed April 23, 1964 6 Sheets-Sheet 3

Inventor:
Marc Charles Joseph Lesueur
BY Baldwin & Wight
Attorneys

Inventor:
Marc Charles Joseph Lesueur
BY Baldwin & Wight
Attorneys

Inventor:
Marc Charles Joseph Lesueur
BY Baldwin & Wight
Attorneys

Inventor:
Marc Charles Joseph Lesueur
BY Baldwin & Wight
Attorneys 3,286,233

FAULT DETECTING DEVICES FOR CHARACTER RECOGNITION

Marc Charles Joseph Lesueur, Chaville, France, assignor to Compagnie des Machines Bull (Société Anonyme), Paris, France Filed Apr. 23, 1964, Ser. No. 362,017
Claims priority, application France, May 30, 1963, 936,523
6 Claims. (Cl. 340—146.3)

The present invention relates to arrangements for analysing documents bearing printed characters, and specially characters composed of vertical strokes, such as those described, for example, in United States Patent No. 3,044,-696, granted July 17, 1962.

In the characters in question, there is employed to enable them to be identified by machine a characteristic parameter which consists in that, of a fixed number of stroke intervals, some are wider than the others and their relative position varies with each character. For example, out of six intervals, two are long and the others short. If the binary value 1 is allotted to the long intervals and the binary value 0 to the short intervals, it is possible to apply a combination code having two positions marked out of six, so that fifteen characters can be distinguished, i.e. the ten decimal digits, plus five special symbols.

It will be recalled that the distance between the homologous edges of two neighbouring strokes is here called an "interval," because the passage of the same edge of a stroke under the transducing slot must serve to discriminate the width of the intervals.

Although it is proposed in the aforesaid patent specification that the strokes associated with the long intervals may be thicker than the strokes associated with the short intervals, it is advantageous to adopt a uniform thickness for all the strokes. This has inter alia the advantage that it permits reading in two opposite directions.

An arrangement for analysing these characters has already been described in the specification of patent application filed in the United States on April 17, 1961, under No. 103,386. In this arrangement, in which the leading edge of each stroke serves as a reference, time measuring devices are provided to distinguish the width of the stroke intervals, as also means for converting the series of reading signals into stored configurations of "1" and "0" representing the analysed characters. In addition, a number of fault detecting devices are also provided in this arrangement, so that only a very small number of chances remains of the printing faults which lead to errors not being indicated to the devices which subsequently utilise the information.

When the characters are printed in a magnetic ink there are a certain number of faults inherent in this type of printing, namely the magnetic ink spots and the ferrous inclusions in the paper of the cheques or other accounting documents. If such a fault is present in the width of a character, causes of erroneous interpretation may arise. If a spot is situated in a short interval and is sufficiently large to mask the space between two strokes, the reading error will be detected by the existing error detecting devices, because the number of strokes counted and/or the number of long intervals counted will then be incorrect. On the other hand, if this spot or inclusion is located in a long interval and close to a stroke, so that the latter becomes equivalent to a thicker stroke, it may happen that the said interval is interpreted as being a short interval and that the succeeding interval, which will normally be assumed to be short, is interpreted as a long interval. The resultant error is the displacement of a long interval and it will be appreciated that this error cannot be detected, since neither the number of strokes read nor the number of long intervals counted is incorrect.

An object of the present invention is to provide an arrangement which is capable of detecting and indicating an error due to a fault of the aforesaid type, in order further to reduce the chances of any undetected faults remaining.

One might obviously think of effecting a direct measurement of the apparent thickness of the strokes, since they must normally all be of the same thickness, namely one half of a short interval.

It has been discovered that it is much more advantageous to effect an indirect checking of this thickness. In accordance with the invention there is provided in a circuit arrangement for analysing a document in movement bearing coded characters which are each composed of a fixed number of separate vertical strokes, said arrangement comprising means for sequentially generating a pulse derived from the rear edge of each of the read strokes, time measuring means for discriminating the time intervals between these pulses and storage means for storing according to this discrimination, among the intervals corresponding to a character, those intervals which are longer than the others, a fault detecting arrangement characterized by second means for sequentially generating a pulse derived from the leading edge of each of the read strokes, second time measuring means for discriminating the time intervals between the latter pulses, second storage means connected to said second time measuring means for storing according to this discrimination the time intervals longer than the others, and comparing logical circuits coupled to the first named storage means and to said second storage means and adapted for generating an error signal upon occurrence of an abnormal time shift between the stored interval representations issued respectively from the rear and leading edges of the character strokes.

It is to be noted that the checking thus effected must not be too strict, as otherwise an untimely emission of error signals may be produced. The real thickness of the printing of the strokes is in fact subject to variations, generally in the sense of an increase. In this respect, the indirect measuring method according to the invention is superior to the direct measuring method because it retains sufficient accuracy while admitting a larger tolerance in the thickness variation of the strokes.

The arrangement is also applicable in cases where the characters are analysed by electro-optical, photoelectric and similar means, because here again any spot may affect, depending upon its position, the correction of the reading signals. Likewise, the invention may equally well be employed when the coding system provides for one, two or three long intervals per character with a view to the coding of the decimal digits and of the letters of the alphabet.

For a better understanding of the invention and the manner in which it may be performed, the same will now be described by way of example, with reference to the accompanying drawings, in which.

Figure 1:
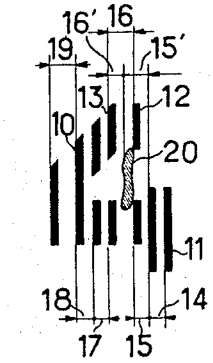
FIGURE 1 illustrates the typical representation of a character.

Referring to FIGURE 1, there will be seen a character specimen represented in accordance with the teaching of the aforesaid United States patent specification No.

3,044,696. The digit 4 illustrated by way of example is composed of vertical bars or strokes, seven in number, some of the strokes, such as 10 and 11, being in unbroken form, while others, such as 12 and 13, are composed of two stroke portions, so as to permit visual identification of the printed digit, which may form part of a number recorded on a bank cheque, for example.

It will be assumed that the reading takes place from right to left, i.e. that the cheque bearing the printed characters is moved from left to right so as to pass under the elongated linear air gap in the magnetic reading head. It is the left-hand edge or rear edge of each stroke which serves as a reference for the measurement of the intervals. The six intervals are designated in the order 14, 15, 16, 17, 18 and 19. The intervals 14, 15, 17 and 18 measure in practice 0.3 mm. and are called "short", and the intervals 16 and 19 measure 0.5 mm. and are called "long". The binary value "0" is allotted to each short interval and the binary value "1" is allotted to each long interval. A coding comprising two positions "1" out of six positions permits of distinguishing the ten decimal digits, plus five special symbols, if the representation is confined to these characters.

Since the speed of travel is constant, the measurement of the intervals between the strokes of a character is effected by means of a measurement of the time intervals between the reading signals or pulses resulting from the reading of the rear edges.

The detection of the long intervals and the strokes permits of determining the relative position of the "1's" and of the "0's" in each character read. Each series of reading signals is converted into a sextuple configuration of 1 and of 0, which is momentarily stored in order to be finally transmitted in parallel to logical decoding circuits. The accuracy of each coded character representation is previously checked by a counting of the strokes and of the long intervals.

All these functions may be carried out by devices such as those described, for example, in United States application Serial No. 103,386. It will readily be seen that the mode of discriminating the width of the stroke intervals admits of a certain tolerance in regard to the thickness of the latter, provided that the excesses or deficiencies in thickness are substantially the same in all the strokes of one character. It is equally obvious that any defect capable of excessively modifying the apparent or real thickness of a stroke may be the cause of an error in interpretation. It it happens that such a defect, constituted by a magnetic ink spot or by a ferrous inclusion in the paper, is located on the character in such manner that the number of long intervals appears to be different from two, or that the number of strokes appears to be different from seven, the probability checking devices readily detect this cause of error and a particular signal is transmitted to the utilisation devices in order that the character read may be regarded as wrong.

Referring now to the case where a magnetic ink spot 20 (FIGURE 1) is located in a long interval such as 16, and more particularly to the rear of the stroke 12, so that in the reading the latter appears as having a thickness distinctly greater than the normal thickness of all the strokes, if the height of this spot is sufficient for the passage of the latter under the reading air gap to give rise to a differentiated pulse of normal amplitude, the time interval measurement will take place on the left-hand edge of this spot, instead of being made on the left-hand edge of the stroke 12. Of course, in this case, the interval discrimination circuits will determine an erroneous configuration of 1 and of 0, since instead of the character 4 being interpreted as containing a short interval 15 followed by a long interval 16, this character will be interpreted as containing a long interval 15' followed by a short interval 16', the other intervals not being modified.

It is found that neither the number of long intervals nor the number of strokes appears as being incorrect, only a long interval taking the place of a short interval and vice versa. The error checking devices are therefore incapable, in this very special case, of detecting an error of this type. It is to be noted that the erroneous configuration of 1 and of 0, i.e. 1 0 0 0 1 0, will be interpreted as representing the digit 1 instead of the digit 4 as printed on the cheque. In a numerical accounting system, an error of this type is unacceptable despite the fact that its probability is extremely low.

It is therefore quite natural to think of effecting a checking of the apparent thickness of each of the character strokes in order to eliminate the erroneous interpretation of any characters afflicted by the aforesaid defects.

Figure 2:
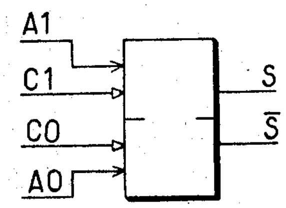
FIGURE 2 illustrates the symbolic representation of a bistable flip-flop circuit.
Figure 4A:
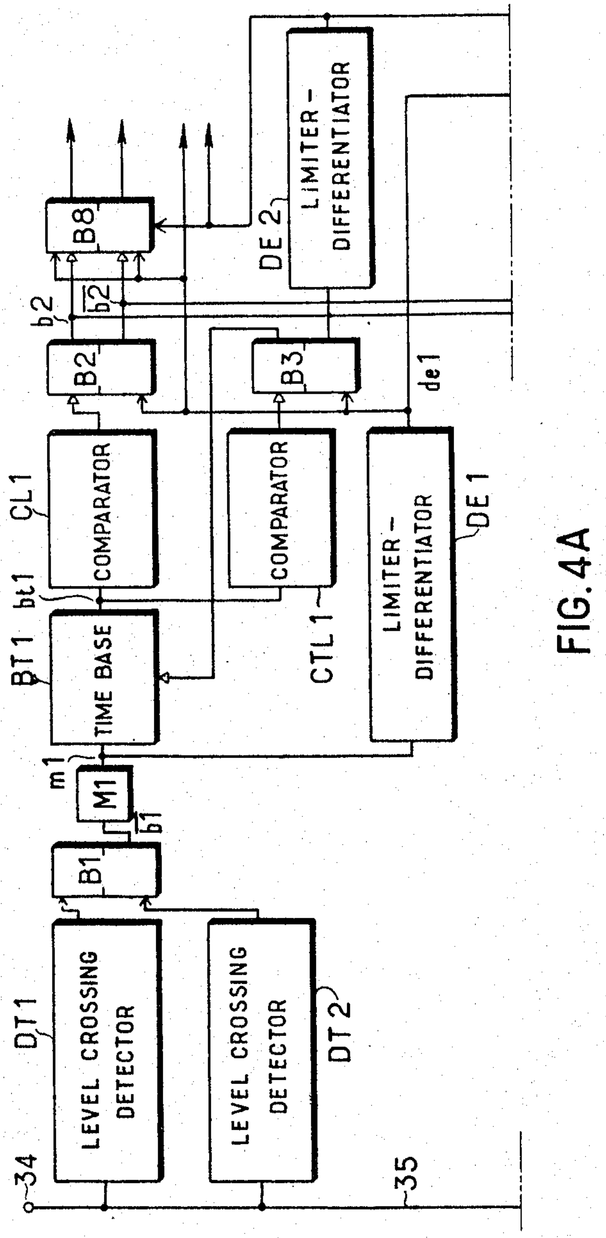
FIGURES 4A and 4B are the basic diagrams of the error detecting arrangement according to the invention.
Figure 4B:
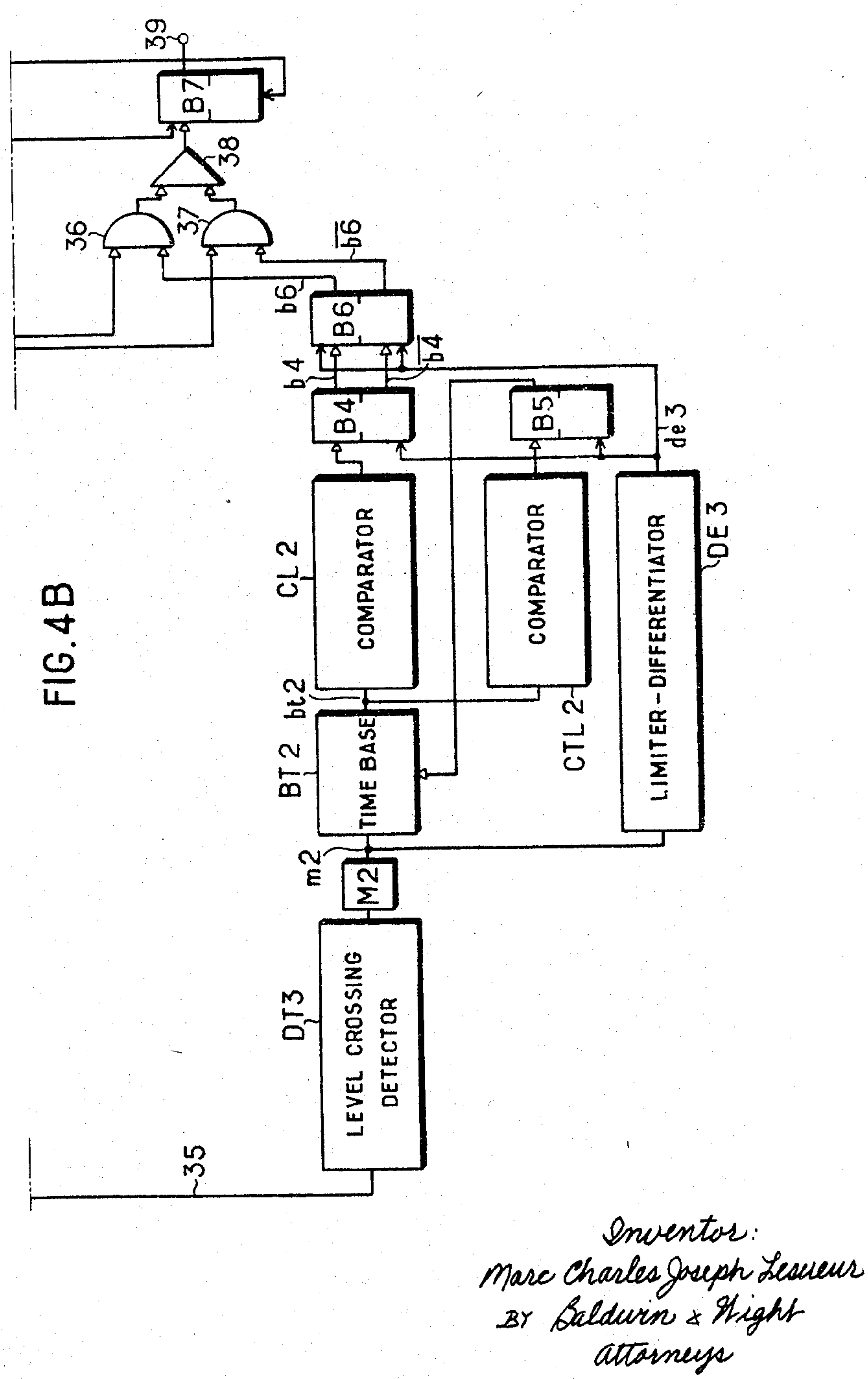

Before proceeding with the description of the arrangement according to the invention, it is necessary to consider FIGURE 2, which illustrates the symbolic representation of a bistable flip-flop circuit, which representation is used in FIGURES 4A and 4B.

As is customary, the bistable flip-flop is represented by a rectangle, the input terminals being situated to the left and the output terminals to the right of the drawings. Such a flip-flop may be composed of two or more transistors completed by the usual feedback cross-couplings. As many known flip-flops of this type are suitable, it is unnecessary to give a detailed description thereof.

It is known that there are two distinct stable states in such a flip-flop. When it is in the active state or "state 1", it is assumed that a high or an upper voltage level is available at the output S, or normal output, while a low, or lower, voltage level is available at the output terminal $\overline{S}$, also called the "complementary output" or "inverse output." These voltage levels are mutually inverted when the flip-flop is in its inoperative state or "state 0."

In order to simplify the representation, it has been assumed that the logical input control circuits are enclosed with those of the flip-flop in the rectangle of FIGURE 2. These are in fact simple circuits each composed of resistances, crystal diodes and a condenser. The small triangle which is seen on the input connections marked C1 and C0 indicates a direct-current coupling input, while the arrow seen on the connections A1 and A0 indicates an alternating-current coupling input. A brief positive pulse applied to the input A1 changes over the flip-flop to the state "1" only if the input C1 receives a high voltage level, and a brief positive pulse applied to the input A0 flanges over the flip-flop to the state "0" only if the input C0 receives a high voltage level.

Figure 3:
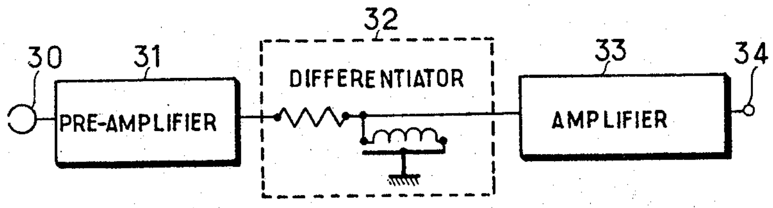
FIGURE 3 is the basic diagram of a character reading network.

The basic diagram of the reading network illustrated in FIGURE 3 will now be considered. The magnetic reading head 30 generates a wave form representing the flux variations produced by the passage of the magnetised strokes of the printed characters under the air gap. This wave form is first amplified by the preamplifier 31 and thereafter transmitted to the differentiating device 32. The latter may consist, as illustrated, of a short-circuited delay line. The delay line receives the amplified reading signal through a resistance equal to its characteristic impedance and effects the quasi-differentiation and the resultant new wave form is amplified as faithfully as possible by the amplifier 33. The wave form available at its output 34 is illustrated at 34 in FIGURE 5. The images of a number of character strokes or bars are shown in block lines on the line 21 of the latter figure.

The leading edge of the first stroke is entirely to the left in the drawing and the graph is constructed on the assumption that there exists a short interval between the first and second strokes, a long interval between the second and third strokes and a short interval between the third and fourth strokes, for example in the case of the parts to the right of the said lines, representing the rear edges of the strokes.

Figure 5:
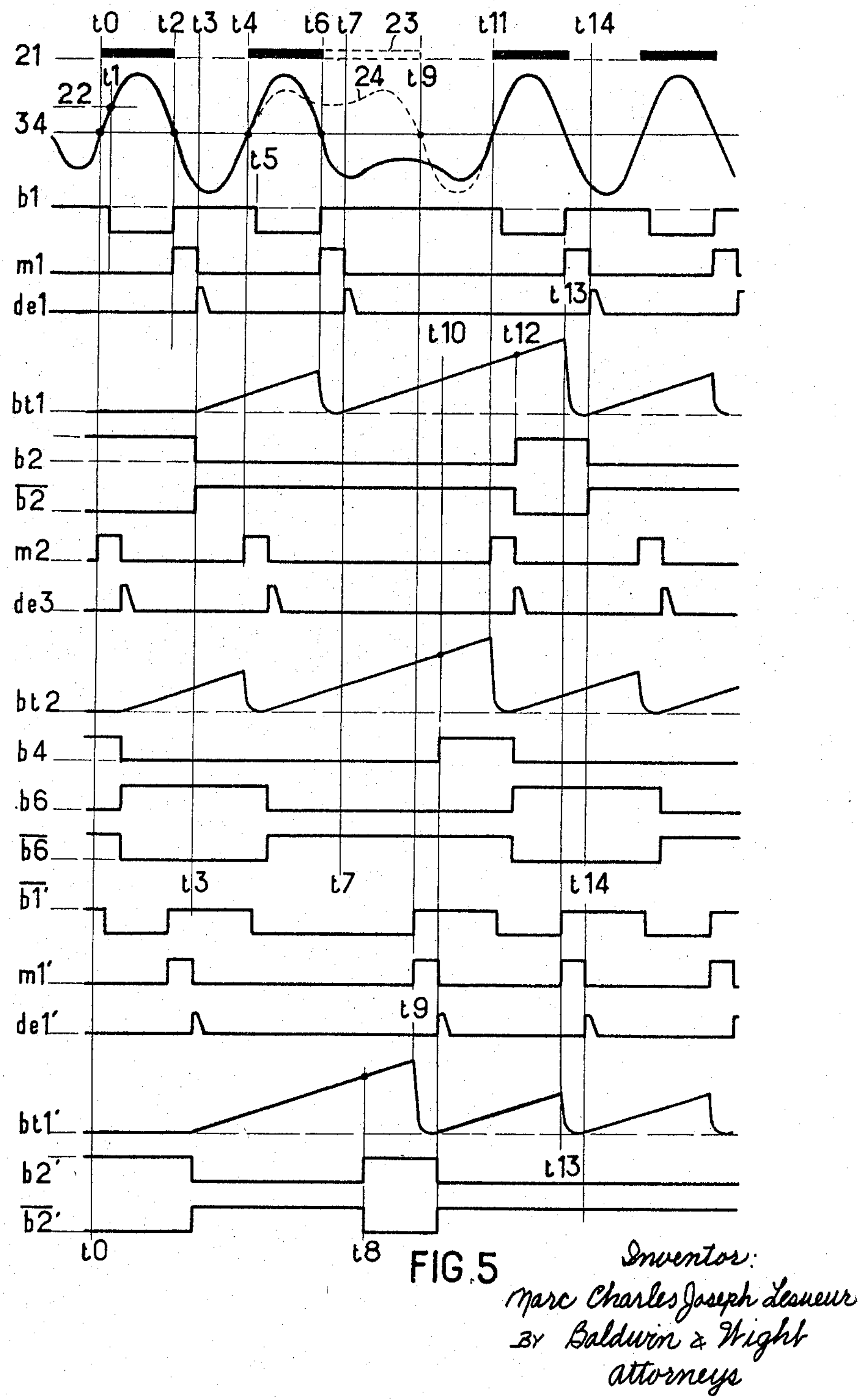
FIGURE 5 is a graph showing, as a function of time, the wave forms which can be detected at certain points of the arrangement.

In FIGURE 5, the wave form 34 has been advanced in time, i.e. displaced to the left. In doing this, no account is taken of the time delay produced by the differentiator 32, but the correspondence of the crossings of the level 0 volt with the forward and rear edges of the strokes will thus be more clearly seen.

FIGURE 4A shows the initially existing devices for effecting the distinction between the long intervals and the short intervals measured from the rear edges of the strokes, as also the devices for the detection of the so-called "very-long" intervals situated between two consecutive characters. FIGURE 4B shows the devices added for the requirements of the invention, i.e. for effecting the indirect measurement of the apparent thickness of the strokes.

In FIGURE 4A, the terminal 34, which is the same as in FIGURE 3, is connected to the inputs of two level crossing detectors DT1 and DT2. A bistable flip-flop B1 is of the type previously mentioned with reference to FIGURE 2, as also are the flip-flops B2 and B8, the functions of which will hereinafter be indicated.

M1 is a monostable flip-flop circuit, the duration of the output pulse which it supplies being utilised as delay time. The time base BT1 and the comparator CL1 co-operate to effect the measurement of the intervals and to detect the long intervals. The fact that a long interval has been detected is memorised by the bistable flip-flop B2. A second comparator CTL1 is also connected to the output of the time base BT1. Owing to a higher comparison voltage threshold, it detects only the occurrence of the "very long" intervals. The presence of a very long interval is memorised by the bistable flip-flop B3.

There is represented by the flip-flop B8 the first stage of the shift register, which serves first to memorise gradually the 0's corresponding to the short intervals and the 1's corresponding to the long intervals, and then to supply on the parallel mode the configuration of 1 and of 0 which it contains after the reading of each character.

The devices illustrated in FIGURE 4B are coordinated in a substantially analogous manner to those of FIGURE 4A. However, there will be noted in addition the logical circuits 36, 37 and 38 and the bistable flip-flop B7, of which the function is to verify that the intervals measured from the rear and front edges, respectively, of the character strokes are constantly equal.

Figure 6:
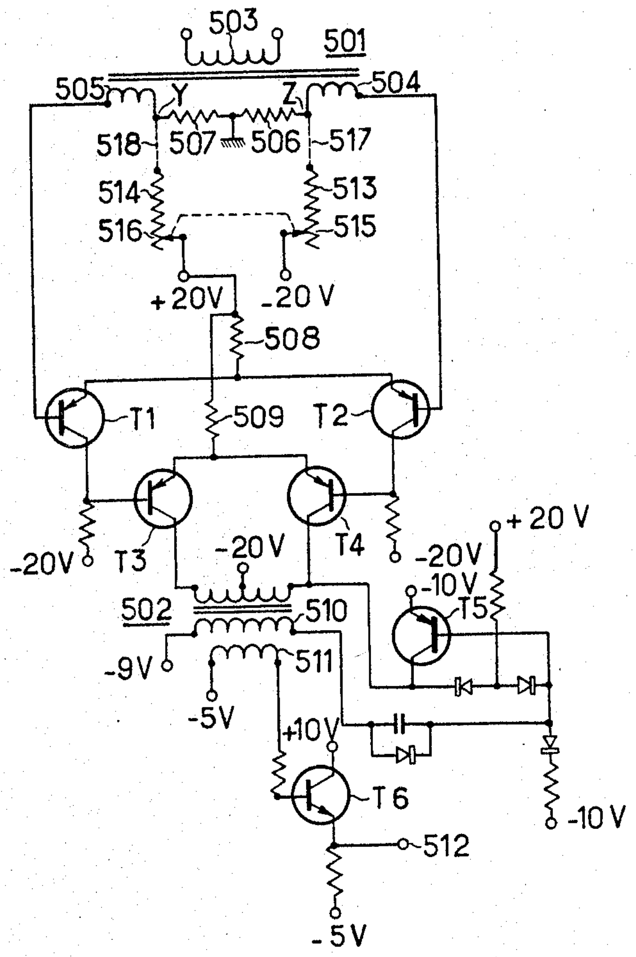
FIGURES 6 to 8 are detailed diagrams of the main elements incorporated in the arrangement.

Before considering the general operation, reference will be made to the detailed diagrams of certain circuits, and first of all to that of a voltage level crossing detector, given by way of example in FIGURE 6. In this assembly, there are grouped a symmetrical amplifier associated with a blocking oscillator and with a pulse generator. The symmetrical amplifier is formed of an input transformer 501, of two amplification stages with the transistors T1 to T4 and of an output transformer 502. One of the input terminals of the primary winding 503 is connected to the input terminal 34 (FIGURES 3 and 4A). The other terminal is connected to earth. One terminal of each of the secondary windings 504 and 505 is connected to earth through a resistance, such as 506 or 507, of a value of 125 ohms. The resistances 508 and 509 are of relatively high value in order that the dynamic characteristic of the amplifier may be linear and well-balanced.

The blocking oscillator consists of the transistor T5, of which the collector is connected to the right-hand terminal of the primary winding of the transformer 502, and of which the base is connected to a terminal of the secondary winding 510. The latter connection includes a crystal diode and a condenser in parallel. In the absence of a signal at its base, the transistor T5 is non-conductive. The output pulse generator consists of the transistor T6, of which the base is connected through a protective resistance to a terminal of a second secondary winding 511 of the output transformer. In the normal state, the transistor T6, which is of the NPN type, is non-conductive and there is a voltage of −5 volts at the output terminal 512.

A threshold voltage adjusting device comprises two fixed resistances 513 and 514, each having a value of 10 kilohms, and two variable resistances 515 and 516. Their sliders being simultaneously actuated, each resistance can be adjusted between 0 and 90 kilohms. When it is desired to apply a threshold voltage to the symmetrical amplifier, the connections 517 and 518 are made.

There will now be considered the operation when the connections 517 and 518 are not made, as in the case of the level crossing detectors DT2 and DT3 of FIGURES 4A and 4B. In the absence of a reading signal at the terminals of the primary winding 503, the transistors T1 to T4 are in an average state of conductivity. A certain collector current flows through each primary half-winding of the transformer 502. It will be assumed that a reading signal such as that of the line 34 (FIGURE 5) reaches the primary winding 503. During the first negative half-cycle, the voltages induced in the windings 504 and 505 are negative and positive respectively. Consequently, the collector current of T4 decreases to the point of being interrupted, while the collector current of T3 increases substantially. The induced voltage then appearing at the secondary winding 510 is positive and can only tend to render the transistor T5 even more non-conductive.

At the instant $t0$, as soon as the positive half-wave succeeds the negative half-wave, the inverse effects are produced. It is clear that an induced voltage of negative direction is now set up across the terminals of the secondary winding 510. The voltage variation is momentarily transmitted through the condenser to the base of the transistor T5. Since the latter becomes conductive, it triggers the well-known regenerative effect, which results in a powerful steep-fronted pulse. The pulse induced at the secondary winding 511 is of positive direction and it produces the conduction of the transistor T6. The elements of the blocking oscillator are such that the positive pulse available at the output terminal 512 has an amplitude of 5 volts and a duration of 2 microseconds.

In order that the detector DT2 may generate this same positive pulse only at the instant $t2$, it is sufficient to reverse the input connections of the primary winding 503 of the transformer 501.

There will finally be considered the operation when the connections 517 and 518 have been made, i.e. in the case of the crossing detector DT1 (FIGURE 4A). Regardless of the value of the threshold voltage adopted, the current flowing through the resistances 506 and 507 renders the junction points Y and X positive and negative respectively. On each side, the high resistance, 514 and 516 and 513 with 515, and the voltage source constitute a substantially constant current source. In the absence of a signal at the primary winding 503, the transistors T2 and T3 are conductive, while the transistors T1 and T4 are non-conductive.

It has been seen that if, during the first negative half-wave, a positive voltage is set up at the secondary winding 510, it cannot influence the transistor T5. During the succeeding positive half-wave, the voltages induced at the secondary windings 504 and 505, cannot reverse the state of conduction of the transistors T2 and T1 until they become higher in absolute value than the voltages existing at the junction points Z and Y respectively. At this instant, such as $t1$ (FIGURE 5), the transistor T4 becomes conductive, while the transistor T3 becomes less conductive and may even be rendered non-conductive. The negative voltage induced at the secondary winding 510 as a result of this triggers, as in the preceding case, the operation of the blocking oscillator and the emission of the output pulse at the terminal 512.

In the reading of the first stroke, the positive output pulse applied by DT1 (FIGURE 4A) to the input A1 of the flip-flop B1 changes the latter to the state 1. This indicates that the reading signal corresponding to the forward edge of the stroke had an amplitude exceeding the minimum threshold. Thereafter, the positive output pulse applied to the input A0 of the flip-flop B1 returns the later to the state 0 at the instant $t2$. These two pulses are always effective because the inputs C1 and C0 (not shown) are connected to a high level voltage, which voltage is in fact that of earth.

Each of the monostable flip-flops M1 and M2 may be a well-known monostable circuit comprising two transistors. It is so designed that it generates at its output a positive pulse of a fixed duration of 10 microseconds (for example line $m1$, FIGURE 5) when it receives at its input a positive pulse or a voltage variation of positive direction. Since the input of M1 is connected to the inverse output of the flip-flop B1, it will be seen (FIGURE 5) that an output pulse of M1 occurs, for example, at the instant $t2$.

Figure 7:
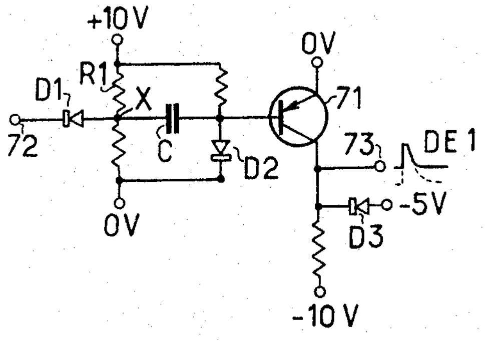

FIGURE 7 shows the detailed diagram of the circuit suitable for the production of either one of the limiter-differentiators DE1 and DE3 of FIGURES 4A and 4B. This circuit is composed of a transistor 71 of the PNP type and of the components illustrated in the diagram. Its input terminal 72 is connected to the output of the monostable flip-flop, for example M1. In the inoperative state, the transistor 71 is non-conductive. The potential at its base is +0.2 volt, and that of the point X is about +0.5 volt, by reason of the current taken up by the diode D1 and the charge of the condenser C is relatively low. During the forward flank of the positive pulse generated by the monostable flip-flop M, the diode D1 is biassed in the inverse conducting direction. The reduction of the current flowing through R1 enables the condenser C to become charged through R1 and D2, and the transistor 71 remains non-conductive. During the negative rear flank of the pulse generated by M1, the diode D1 is rendered conductive and tends to return the circuit to its previous state. In order to discharge, the condenser C takes up a fairly considerable current which must come from the base of the transistor 71, which suddenly becomes conductive. The output pulse appearing at the output terminal 73 changes between the voltages −5 volts and 0 volts. If the diode D3 were omitted, the amplitude of the output pulse would be greater, but a curvilinear rear flank would be set up. Owing to the limiting diode D3, the form of the output pulse is substantially trapezoidal. Its duration is 2 to 3 microseconds. This device is therefore not properly speaking a differentiator, but it is capable above all of responding only to the negative rear flank of the signal received, by generating a pulse of fairly well-determined amplitude and duration. Such a device could very well be replaced by a monostable flip-flop, but this would be more costly.

The limiter-differentiator DE2 of FIGURE 4B may be designed in accordance with the same principles, but it must be adapted to supply a pulse of negative polarity and of a duration of 5 to 6 microseconds.

Figure 8:
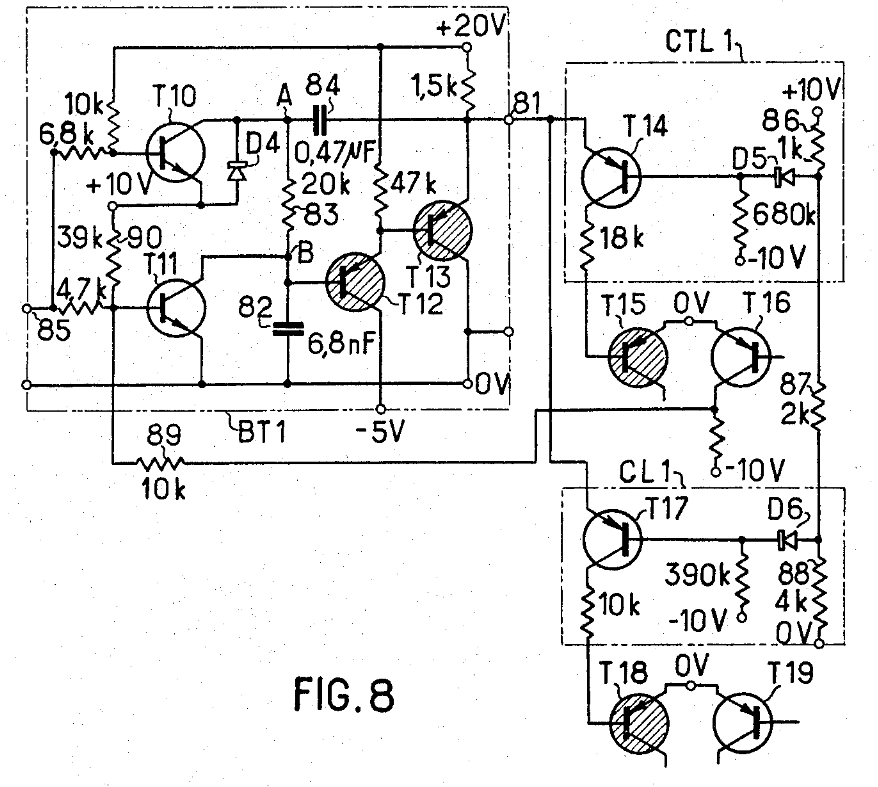

FIGURE 8 shows the circuits constituting one of the time bases, for example BT1, and the comparators CL1 and CTL1. The time base BT1, or sawtooth voltage generator, comprises essentially two transistors T10 and T11, of NPN type, and two transistors T12, T13 of PNP type. The latter two constitute an amplifier with two emitter-followers connected in cascade. The output impedance of the generator is therefore low. An output voltage available at the output terminal 81 can increase linearly because the charge of the condenser 82, which is 6.8 nonofarads, takes place at constant current. This current is for the greater part supplied by the resistance 83 of 20 kilohms. The condenser 84 of 0.47 microfarad, which is thus of a much higher value than 82, constitutes in practice a constant voltage source. In order that the generator may supply an increasing voltage at its output, the transistors T10 and T11 must be non-conductive, and for this purpose the voltage applied to the input 85 must be zero at this instant. The components are so chosen that the charge current flowing through the condenser 82 is slightly higher than 0.5 milliampere, the greater part being supplied by the resistance 83 and condenser 84, and the remainder, several microamperes, being the base current of the transistor T12. The voltage at the point A being higher than +10 volts, the diode D4 is rendered non-conductive. The potential difference across the terminals of the resistance 83, i.e. between A and B, is therefore constant and equal to about 10 volts. The voltage across the terminals of the condenser 84 is also equal to about 10 volts and it has not sufficient time to vary much during the duration of one sawtooth.

The application of a pulse emanating from the monostable flip-flop M1 to the input of the time base has the effect of rapidly reducing the output voltage at the terminal 81. When this positive pulse appears, the voltage at the input terminal 85 changes to +10.3 volts. The transistors T10 and T11 immediately become conductive. The conducting transistor T11 has the object of rapidly increasing the currents flowing through the transistors T12 and T13. The collector current of T11 emanates from the resistance 83, from the base of T12 and finally from the condenser 82, which it exponentially discharges. The collector current of T11 emanates solely from the condenser 84 and it has the effect of enabling the voltage of the point A to decrease at least as rapidly as the voltage at the point B, the diode D4 being designed to prevent the voltage at the point A from falling substantially below +10 volts. On termination of the pulse of the monostable flip-flop, which lasts ten microseconds, the output voltage reaches the neighbourhood of 0 volt and a further sawtooth is initiated.

Each of the comparators is a simple circuit. For example, the comparator CL1 comprises a transistor T17 which receives at its emitter the sawtooth voltage available at the terminal 81 and which receives a constant comparison voltage at its base. The comparator CTL1 comprising the transistor T14 has a similar structure. The comparison voltages are supplied by a voltage divider connected between +10 volts and 0 volt and comprising the resistances 86, 87 and 88.

A resistance of 10 kilohms connects the collector of T17 to the base of transistor T18, which, like T19, forms part of the flip-flop B2 of FIGURE 4A. In the same way a resistance of 18 kilohms connects the collector of T14 to the base of the transistor T15 which, like T16, forms part of the flip-flop B3. It will be assumed that these two flip-flops are in the state 0, i.e. that the transistors T15 and T18 are conductive. As long as the increasing voltage of the sawtooth applied to the emitter does not exceed, say, 5.5 volts, which is the voltage of the cathode at the diode D6, T17 is non-conductive. Immediately the sawtooth exceeds this voltage level, T17 becomes conductive, the diode D6 preventing its base current from flowing through the voltage divider. The collector current of T17 across the resistance of 10 kilohms is sufficient to render T18 non-conductive, so that the flip-flop 32, which changes to the state 1, memorises the fact that the minimum limit allotted to a long interval between the two rear stroke edges has been exceeded.

The transistor T14 of the comparator CTL1 functions in the same way. However, the voltage level applied to its base is +8.5 volts, and the flip-flop which it controls therefore changes to the state 1 only when the minimum limit allotted to a very long interval has been passed.

The diagram of FIGURE 8 indicates that the resistance 89 connects the collector of the transistor T16 to the base of the transistor T11. When the flip-flop B3, comprising T15 and T16, is in the state 0, T16 is non-conductive and in this case the current set up across the resistance 89 is such as to enable the pulse of the monostable flip-flop M1 applied to the input 85 to render T11 conductive or non-conductive, and thus to permit normal operation of the time base BT1. On the other hand, when T16 has become conductive, after the detection of a very long interval, the potential of its collector reaches the neighbourhood of 0 volt. The resistance 90 of 39 kilohms then ensures the supply of a base current from T11, which becomes conductive, so that after the discharge of the condenser 82 the time base is rendered non-conductive its output voltage being maintained in the neighbourhood of 0 volt.

Reference will now be made to FIGURES 4A and 5, and the measurement of the intervals from the rear edges in the absence of a defect will be considered. It is to be noted that before the reading of the first stroke the flip-flops B2 and B3 are in the state 1, see lines *b2* and $\overline{b2}$ in the case of the flip-flop B2 which memorises the long intervals.

As a result of the reading of the first stroke, it is not at the instant *t*0 but at the instant *t*1, that DT1 causes the flip-flop B1 to change to the state 1, by reason of the positive threshold adopted for DT1. At the instant *t*2, DT2 returns the flip-flop B1 to the state 0. At this instant, the monostable flip-flop M1 supplies the first pulse *m*1. At the instant *t*3, at the time of the negative flank of *m*1, DE1 supplies the first pulse *de*1, which has the effect of returning the flip-flops B2 and B3 to the state 0. From this instant, the time base BT1 is no longer inhibited by the normal output of B3 and it generates the first sawtooth *bt*1. At the instant *t*3 also, the negative pulse produced by DE2, which lasts longer than *de*1, returns to the state 0 the flip-flop B7, FIGURE 4B, as also all the flip-flops of the shift register, of which only the flip-flop B8 of the first stage is shown (FIGURE 4A). The reading of the second stroke gives rise to a new change to the state 1 of the flip-flop B1, from the instant *t*5 until the instant t6, at which a new pulse *m*1 is generated, which interrupts the first sawtooth. Since the first interval is short, this state of the flip-flop B2 is not changed by the comparator CL1.

A second sawtooth commences at the instant *t*7 and will continue until the instant *t*13. However, at the instant *t*12, the comparator GL1 detects that the minimum limit allotted to a long interval (18 μ's corresponding to 0.4 mm.) has been passed and it causes the flip-flop B2 to change to the state 1. The latter is returned to the state 0 at the instant *t*14.

Referring now to FIGURE 4B, concerning which it must be stated that the devices illustrated are identical to the homologous devices of FIGURE 4A, the only differences are that the level crossing detector DT3, in contrast to DT1, does not receive any threshold voltage, and that its output is connected directly to the input of the monostable flip-flop M2. Consequently, at the instant *t*0, when the wave form 34 crosses the level 0 volt in the positive direction, the first pulse *m*2 is triggered. Examination of the wave forms *m*2, *de*3, *bt*2, *b*4, *b*6, $\overline{b6}$, FIGURE 5, shows how the measurement of the intervals from the forward edges of the strokes take place.

It will be seen that the flip-flop B4 registers the presence of a long interval (time *t*10–*t*12) with a time advance of half a short interval in relation to the flip-flop B2 (time *t*12–14). Since it is essential to effect a comparison of these flip-flops in order to ensure that there is no defect, use is made of a method consisting in adding a further flip-flop B6 and in connecting the logical circuts 36 to 38 in a particular manner. The inputs C1 and C0 of the flip-flop B6 are connected to the normal and inverse outputs respectively of the flip-flop B4, while the inputs A1 and A0 receive the pulses *de*3 as if it were a question of a shift register. By this means, the flip-flop B6 always assumes, at the reception of a pulse *de*3, the state in which the flip-flop B4 was just before the arrival of this pulse, unless it is not already in the same state as the latter. This is rendered possible by the temporary memorising function performed by the aforesaid logical circuits comprising diodes and condensers.

The logical circuits 36 and 37 are two-input OR circuits. There has been symbolically shown at 38 an AND circuit followed by an inverting amplifier. The input C1 of the flip-flop B7 is connected to the output of the device 38, while its input A1 receives the pulses *de*1 from the limiter-differentiator DE1 (FIGURE 4A). The OR circuit 36 has its inputs connected to the output $\overline{b2}$ of B2 and to the output *b*6 of B6, respectively. The OR circuit 37 has its inputs connected to the output *b2* of B2 and to the output $\overline{b6}$ of B6 respectively.

As long as the comparison of the intervals measured from the rear and forward edges shows that they are equal, the normal output of the flip-flop B7 remains at the low voltage level, thus indicating that there is no defect. In other words, this flip-flop normally must never be changed over to the state 1 on reception of the pulses *de*1. For this purpose, it is necessary that its input C1 should always receive a low level. It follows that the two inputs of the inverting AND circuit 38 must simultaneously receive a high level. For this purpose, it is necessary that at least one of the two pairs of inputs of the OR circuits 36 and 37 should receive a high level.

Now, if the voltage levels visible on the wave forms *b*2, $\overline{b2}$, *b*6 and $\overline{b6}$ are compared, it will be seen that in the absence of a defect at least one of the inputs of 36 and 37 does in fact receive a high level at the instants *t*3, *t*7 and *t*14 when the pulses *de*1 are produced, or that one of these inputs has received a high level just before one of these instants.

The wave forms $\overline{b1}'$, *m*1′, *de*1′, *bt*1′, *b2*′, $\overline{b2}'$ are given (FIGURE 5) to explain the operation when a defect results in an apparent widening of the rear portion of, say, the second stroke, as shown in chain-lined form at 23 on the line 21. The reading signal 34, after differentiation, then takes the modified form indicated at 24 by a chain-line. It will be seen (line $\overline{b1}'$) that the flip-flop B1 is returned to the state 0 only at the instant *t*9. Slightly before this, at the instant *t*8, the flip-flop B2 has changed to the state 1 because a long interval has been detected by the comparator. The flip-flop B2 is returned to the state 0 at the instant *t*10. Since the second interval measured at instant *t*13 appears as a short interval, the flip-flop B2 remains in the state 0. Now, since the measurement of the intervals from the forward edges has not been disturbed, the wave forms *b*6 and $\overline{b6}$ remain valid. On comparing them with the wave forms *b2*′ and $\overline{b2}'$, it will be seen that the defect will be detected at the instant *t*14, since the inputs of the OR circuit 36 receive a high level of $\overline{b2}$ and of *b*6, but on the other hand the inputs of the OR circuit 37 simultaneously receive a low level from the outputs *b2* and $\overline{b6}$. At this instant, therefore, the inverting AND circuit 38 applies a high level to the input C1 of the flip-flop B7, and the pulse *de*1 can change the flip-flop B7 to the state 1. The error signal appearing at the output 39 can be memorised by a store which has the object of also storing other error signals capable of being supplied by the other existing checking devices already mentioned.

It will readily be appreciated that a defect affecting the forward edge of a stroke in a long interval would also be infallibly detected by the circuits which have just been described. This possibility affords the advantage that the characters may also be scanned even when they are moved in the opposite direction, without any modification to the recognition arrangement.

To conclude the description concerning the arrangement according to the invention, it may be observed that the level crossing detector DT3 (FIGURE 4B) and the monostable flip-flop M2 form means for generating a pulse derived from the forward edge of each of the character strokes. The time base BT2 and the comparator CL2 constitute means for measuring and discriminating the time intervals between these derived pulses, while the bistable flip-flops B4 and B6 constitute means for memorising, in accordance with this measurement, the intervals which are longer than the others.

It is obvious that, for carrying out the essential functions, use could be made of technical means different from those set forth in the foregoing description, the circuits illustrated constituting only an example of a possible embodiment.

I claim:

1. A circuit arrangement for analysing a document in movement bearing coded characters which are each composed of a fixed number of separate vertical strokes, said arrangement comprising in combination: first means for sequentially generating a pulse derived from the rear edge of each of the read strokes, first time measuring means for discriminating the time intervals between these pulses, a first bistable flip-flop connected for storing according to this discrimination, among the intervals corresponding to a character, those intervals which are longer than a predetermined time period, a fault detecting arrangement including second means for sequentially generating a pulse derived from the leading edge of each of the read strokes, second time measuring means for discriminating the time intervals between the latter pulse's a second bistable flip-flop connected to said second time measuring means for storing according to this discrimination the time intervals longer than said predetermined time period, and comparing logical circuits coupled to said first bistable flip-flop and to said second bistable flip-flop and adapted for generating an error signal upon occurrence of an abnormal time shift between the stored interval representations issued respectively from the rear and leading edges of the character strokes.

2. A circuit arrangement according to claim 1, wherein each of said time measuring means includes a voltage comparator associated to a time-base generator and wherein each of said bistable flip-flops is connected to assume an active state under control of the associated voltage comparator when the latter detects a long time interval between two successive pulses.

3. A circuit arrangement according to claim 2, wherein said comparing circuits include an AND-circuit connected through two OR-circuits to outputs of said first and second storage means in such a manner to emit an error signal when a long interval representation is stored by a single one of said first and second bistable flip-flops.

4. A fault detecting arrangement for analysing a document in movement bearing printed coded characters thereon, which characters are each composed of a fixed number of separate vertical strokes, said arrangement comprising in combination first generator means for sequentially generating a pulse derived from the rear edge of each of the read strokes, second generator means for sequentially generating a pulse derived from the leading edge of each of the read strokes, first and second time measuring means respectively coupled to said first and second generator means each for detecting in the time intervals between the respective sequential pulses those intervals exceeding a given time limit, first and second binary storage cells respectively coupled to said first and second time measuring means each for storing the detection of such a long time interval, and comparing logical circuits connected to outputs of said first and second storage cells and adapted to generate an error signal upon discrepancy detected in the contents of said first and second storage cells at a given time.

5. A fault detecting arrangement as claimed in claim 4, wherein both of said first and second time measuring means comprise each a saw-tooth wave generator and a voltage comparator, each of said storage cells being composed of a two-input bistable trigger circuit with one input connected to an output of the associated voltage comparator to assume an active state when the latter has detected a long time interval, and coupling circuit means arranged to apply said edge derived pulses to the second input of each of said bistable circuits.

6. A fault detecting arrangement as claimed in claim 5, wherein said second storage cell comprises a further two-input bistable circuit coupled to said first bistable trigger circuit and wherein said comparing circuits comprise a first OR-circuit with two inputs connected to opposite outputs of said first bistable circuit and of said further bistable circuit, a second OR-circuit with two inputs connected to other opposite outputs of both said bistable circuits, and an AND-circuit the inputs of which are connected respectively to the outputs of said OR-circuits.

References Cited by the Examiner

FOREIGN PATENTS 915,344 1/1963 Great Britain.
1,271,150 7/1961 France.

MAYNARD R. WILBUR, *Primary Examiner.*

MALCOLM A. MORRISON, *Examiner.*

J. E. SMITH, *Assistant Examiner.*